United States Patent [19]

Baker

[11] Patent Number: 4,609,965

[45] Date of Patent: Sep. 2, 1986

[54] MAGNETIC CLUTCH

[75] Inventor: William A. Baker, Milwaukee, Wis.

[73] Assignee: PT Components, Inc., Indianapolis, Ind.

[21] Appl. No.: 669,683

[22] Filed: Nov. 9, 1984

[51] Int. Cl.[4] ...................... H01H 47/06; F16D 27/06

[52] U.S. Cl. .................................... 361/160; 361/154; 361/210; 361/194; 335/256; 192/84 A

[58] Field of Search ............... 361/154, 160, 194, 210; 335/256, 266; 192/84 A, 84 B, 84 E; 310/78, 92, 94

[56] References Cited

U.S. PATENT DOCUMENTS 1,872,369 8/1932 Van Sickle .......................... 335/256
2,457,017 12/1948 Walley ............................... 335/266
2,540,022 1/1951 Rabenda ............................. 335/266
2,951,189 8/1960 Hajny ................................. 335/266
3,763,968 10/1973 Noly .................................. 361/210

*Primary Examiner*—L. T. Hix
*Assistant Examiner*—David M. Gray
*Attorney, Agent, or Firm*—Robert A. Brown

[57] ABSTRACT

A device is provided that begins an electrical starting mode in a parallel circuit configuration providing an improved speed of response and after an interval of time, current is switched to a series circuit configuration for operation during a run mode. The device is initially energized at several times the power normally required to activate a coil and switching means is thereafter utilized to reduce power to a normal requirement soon after the coil is energized.

8 Claims, 4 Drawing Figures

MAGNETIC CLUTCH

BACKGROUND OF THE INVENTION

The present invention relates generally to electromagnetic control devices, such as relays, solenoids, clutches and brakes and more particularly to a class of these devices wherein it is desired to "FORCE" the operation of the device so as to obtain rapid travel and overcome high inertial and spring loading.

It is common practice in the industry to provide the desired forcing action by generating a magnetic force that is substantially greater than required to marginally actuate the device or to maintain the device in an actuated state. This practice is acceptable in applications that require only a short or intermittent duty cycle where heat generated by such over-energizing is not deleterious to the life or operation of the device. When continuous duty is required, various switching arrangements have been used to connect an additional resistance or coil winding in such a way that additional force is obtained only when the device is initially energized and the magnetic force is thereafter reduced to a level sufficient to maintain the device energized but is within the continuous duty ratings of the device.

All of the prior art relating to this problem have a similar deficiency in that the additional coil or winding is only used for a portion of the operation. Some coils or windings are used only during pull-in and others are used only after pull-in has occurred. This obvious inefficiency is costly in terms of money, complexity, energy, size and weight.

Illustrative of the manner in which a number of inventors have attempted to solve existing problems may be found in U.S. Pat. Nos. 2,457,017; 2,540,022; and 2,951,189. In U.S. Pat. No. 2,457,017 to Walley, there is disclosed mechanical structure that emphasizes the advantages of high contact pressure, sensitivity and shock resistance due to the lightweight of the contacts. Electrically, it places a second winding in series with the main winding to reduce the current and power.

U.S. Pat. No. 2,540,002 to Rabenda discloses and teaches the use of two coils in PICK-UP & HOLD. Rabenda addresses the problem where many of these relays are used in close proximity; i.e., adding machines, etc. Each coil then acts as a miniature transformer and couples to the adjacent coils to alter their pick-up and release characteristics.

U.S. Pat. No. 2,951,189 to Hajny shows and teaches motor principles to cause rotation of a crank and thus operation of a valve. The rotary motion is also used to cause a switching action through a slip ring and contact arrangement to connect or disconnect a second coil in series with the pick-up. There are shown two switching arrangements. One shorts a coil out of the circuit and the other switches a coil into the circuit.

SUMMARY OF THE INVENTION

Accordingly, it is a primary object of the present invention to provide an improved electromagnetic device and associated switching means which will supply an optimum magnetic force or ampere turns during a start mode or pull-in condition and a minimum magnetic force or ampere turns after pull-in and during a run mode and thereby overcome the aforementioned disadvantages of the prior art.

It is a further object of the present invention to provide a device that includes the desired features of increased ampere turns during pull-in and decreased ampere turns after pull-in at a maximum speed of response or during a reduced or minimum interval of time. The instant invention can be accomplished by using tools, techniques and materials presently available to the ordinary person skilled in the art.

An additional object of the present invention is to provide an improved arrangement for obtaining a desired forcing function at a maximum speed of response that can be adapted to equipment and devices presently installed or operating in the field and thereby greatly improve their performance.

A device in accordance with the present invention comprises a unique switching arrangement, actuated by appropriate switching means, which places two or more windings of an electromagnetic coil first in a parallel configuration for pull-in and then in a series configuration after pull-in. The advantages achieved by the present invention include maximum flux density, high currents and low resistances available for pull-in; minimum flux density, low currents, and desirable resistances for holding, or after pull-in. The device accomplishes an efficient use of space, weight, wire and energy because both windings perform a useful function at all times.

DESCRIPTION OF THE DRAWINGS

The foregoing and other characteristics, objects, features and advantages of the present invention will become more apparent upon consideration of the following detailed description, having reference to the accompanying figures of the drawings, wherein.

DESCRIPTION OF A PREFERRED EMBODIMENT

After considering disclosures and teachings of the aforementioned and other references representing the state of the art, there will now be described a preferred embodiment of the present invention. It will be apparent that the unique arrangement hereinafter disclosed may be utilized in any electromagnetic device wherein the number of ampere-turn windings required to place the device in an initially energized condition is greater than the number of ampere-turn windings to maintain the device in an energized or run mode.

Figure 1:
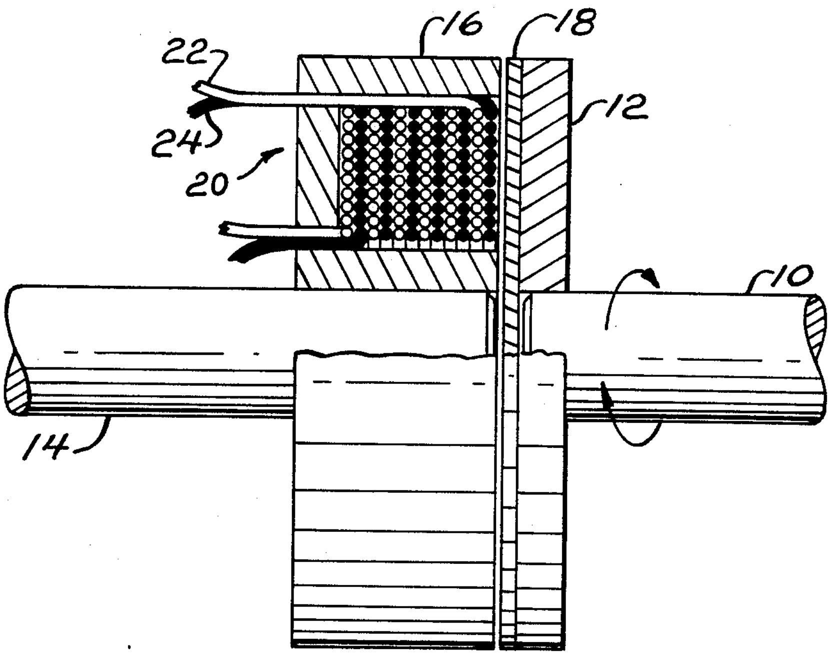
FIG. 1 is a side elevational sectioned view of a coil of an electromagnetic clutch in accordance with the invention.

Referring to the drawings and in particular to FIG. 1, there is shown a section of an electromagnetically operated clutch and associated components wherein a driven rotatable shaft 10 is coupled rigidly to a clutch plate 12 for angular movement therewith. A rotatable drive shaft 14 is connected rigidly to a clutch housing 16 for imparting angular movement thereto. Frictional engagement or interface between the clutch housing 16 and the clutch plate 12 is accomplished by a clutch disc 18 having a relatively high or large coefficient of friction in a manner typical of these known types of clutches. Thus, the drive shaft 14 is effective to cause the driven shaft 10 to rotate when the clutch housing 16 engages the clutch plate 12 by means of the clutch disc 18.

The clutch plate 12 rotates with the driven shaft 10 but also is free to slide axially along the driven shaft 10 to engage the clutch disc 18. The clutch housing 16 rotates with the drive shaft 14 and contains therein an electromagnetic coil, indicated generally by the reference numeral 20. The coil comprises two separate windings 22 and 24 providing resistances $R_1$ and $R_2$, that differ from each other by the number of turn windings used respectively therein. The windings 22 and 24 are wound such that their magnetic field reinforce each other when both are energized with a desired or preselected voltage and polarity. When the coil 20 is energized, clutch housing 16 becomes an electromagnet with an effective field of force that attracts the clutch plate 12, causing it to move toward the clutch housing 16 with sufficient force so as to couple the two shafts together through clutch disc 18 causing them to rotate as one.

Figure 2:
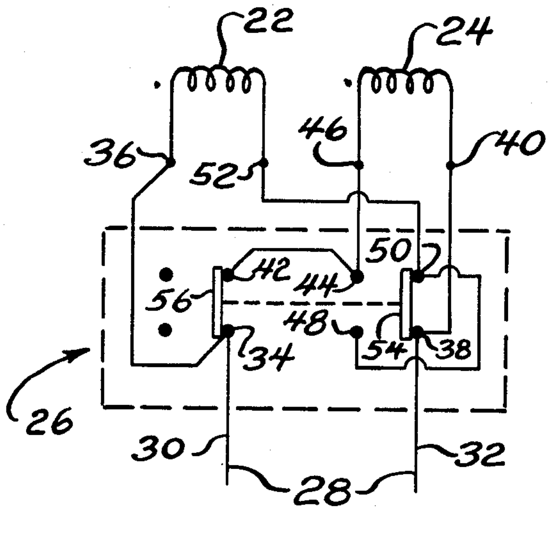
FIG. 2 is a schematic wiring diagram depicting the manner in which the coil windings are interconnected for one phase of operation.
Figure 3:
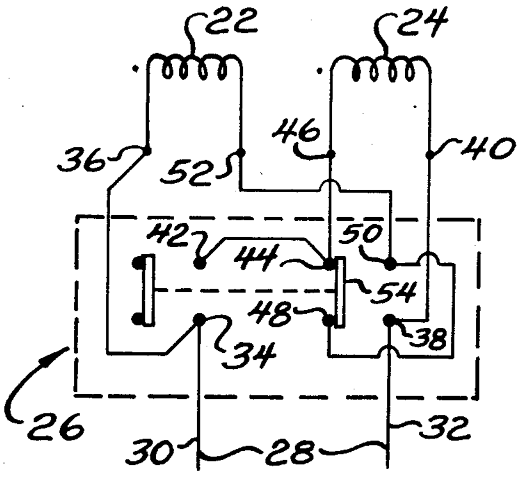
FIG. 3 is a schematic wiring diagram depicting the manner in which the coil windings are interconnected for an alternate phase of operation.
Figure 4:
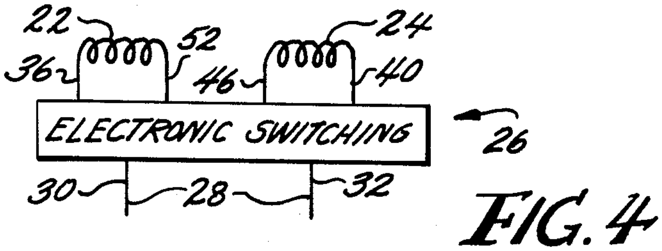
FIG. 4 is a schematic wiring arrangement depicting the manner in which electronic switching means is utilized for operation of the invention.

Now referring to FIG. 2 and FIG. 3, there are depicted two schematic diagrams showing a preferred winding or direction of polarity and how the windings 22 and 24 of the coil 20 are interconnected during operation.

In each of FIGS. 2 and 3, there is shown a switching means 26 effective to receive electrical current from a DC power source 28 and direct the current to energize the coil windings 22 and 24 of the coil 20. The power source 28 is connected to input terminals 30 and 32 of the switching device 26. The device 26 further includes a plurality of internal contacts and terminals or other suitable means for conducting energy to the coil 20. The switching arrangement, for purposes of simplicity, is shown by reference to known relay contacts, but it should be understood that any switching device could be used, such as solid state components, or the like. Actuation of the switching device can be caused by any suitable means including mechanical motion, timed relays, manual switches, or the like. It will be understood that actuation of switching device 26 will take place quickly or at instantaneous fast response in any desired or preselected minimum interval of time after pull-in has occurred. An example of suitable electronic means for avoiding or minimizing contact sparking and wear of switching means 26 may be found in Assignee's copending U.S. patent application, Ser. No. 514,699, filed July 18, 1983 entitled Operating Coil Control System.

Referring to FIG. 2 there is shown a desired switching arrangement during pull-in and it operates in a manner as hereinafter described. The DC power source 28, typically any desired voltage, is applied to input terminals 30 and 32 of the switching device 26. The terminal 30 is connected to a contact 34 and also to a terminal 36 located at a first or start side of the coil winding 22.

Similarly, the input terminal 32 is connected to a stationary contact 38 and also to a terminal 40 located on a first or end side of the coil winding 24. Contacts 42 and 44 are interconnected and the contact 44 is in turn coupled to a terminal 46 located at the second or start side of the coil winding 24. A contact 48 is interconnected to a stationary contact 50 and contact 50 is in turn coupled to a terminal 52 located at the second or end side of the coil winding 22.

As shown in FIG. 2, the flow of current from the input terminal 30 is conducted through contacts 34 and 36 to the start side of coil 22 and returns through the contact 52 to the stationary contact 50, across a normally closed movable contact 54 to the stationary contact 38 connected to the terminal 32 of the power source 28. Current also flows from the stationary contact 34 across a normally closed movable contact 56 to the stationary contact 42, then to the contact 44 and to the terminal 46 at the start side of the coil 24 and returns to terminal 32 through contacts 40 and 38. It will be readily noted that the circuity shown in FIG. 2 depicts coil windings 22 and 24 connected in parallel.

Now referring to FIG. 3, current from terminal 30 to the terminal 36 of the coil 22 continues to flow through contact 34. However, actuation of switching means 26 has taken place and the movable contact 56 has been moved to an open position, so that no flow of current occurs between the contacts 34 and 42. Current flow from the end side of coil 22 returns through the contacts 52, 50, 48, across the movable contact 54 that now has been moved to a closed position to connect with the contact 44, permitting further current flow to the contact 46 at the start side of the coil 24. Current is returned from the end side of coil 24 through contacts 40 and 38 to the input terminal 32. It will now be readily noted that the circuity of FIG. 3 depicts the windings 22 and 24 connected in series. It will be understood that both FIGS. 2 and 3 show polarity or direction of current flow beginning at a designated or start side of each of coils 22 and 24. Polarity or current flow could occur in an opposite direction so long as the orientation of start and end sides of coils 22 and 24 are maintained as shown herein.

Thus, each coil 22 and 24 is energized continuously both during and after pull-in. In each mode, the turns of the coils 22 and 24 are added or summed together to obtain the total number of effective windings of the coil. A substantial additional advantage is realized when the ampere-turns (NI) are calculated.

In the parallel configuration of FIG. 2 used during pull-in, the current is determined by the equivalent parallel resistance of $R_1$ and $R_2$. This is calculated using the product over the sum formula for parallel resistance or $$R = \frac{R_1R_2}{R_1 + R_2}.$$

In the series connection of FIG. 3 used after pull-in, the current obtained is calculated using the sum of the resistances, designated respectively, $R_1$ and $R_2$ of coils 22 and 24.

The resulting resistance in parallel configuration is less than either $R_1$ or $R_2$ alone and depending on the values, the ampere-turns obtained are substantially higher for pull-in than for holding. As a minimum example, if $R_1$ and $R_2$ are equal, the resulting ratio between pull-in and hold or run mode currents is 4 to 1.

The preferred embodiment disclosed herein is depicted as a combination of two coils. It will be understood that it is possible within the scope of the present invention to separately connect combinations of multiple coils first in parallel and subsequently in series to achieve fast response in changing from a start to a run mode operation. It is also possible to utilize an AC power source to achieve the objects of the present invention.

While the invention has been described with reference to a preferred embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

I claim:

1. Apparatus for energizing a magnetic clutch including input drive means selectively connectable at times to output drive means, comprising electromagnetic coil means contained in said input means, first coil winding means forming first resistance means within said coil means, second coil winding means forming second resistance means within said coil means, a power source providing energy to said first and said second coil winding means, switching means connected to said first and said second coil winding means, said switching means being effective at times to connect said first and said second coil winding means in parallel and at other times in series, whereby said clutch is initially energized at a maximum ampere turns start mode providing maximum speed of response when said first and second coil winding means are connected in parallel and said clutch is thereafter energized to a minimum ampere turns run mode when said first and second coil winding means are connected in series.

2. Apparatus as claimed in claim 1 wherein said switching means comprises normally closed movable contact means for placing said first and said second coil winding means in an initially energized condition.

3. Apparatus as claimed in claim 1 wherein said switching means comprises normally open movable contact means for placing said first and said second coil winding means in a reduced power run mode condition.

4. Apparatus as claimed in claim 1, 2 or 3 wherein said first and said second coil winding means comprise an equal number of turn windings, said first and said second coil winding means when initially energized in parallel configuration being effective to provide current at a level four times that required during run mode energization.

5. Apparatus as claimed in claim 1, 2 or 3 wherein said first and said second coil winding means are energized continuously during both start and run mode conditions.

6. Apparatus as claimed in claim 1 wherein said power source comprises DC current.

7. Apparatus as claimed in claim 1 wherein said power source comprises AC current.

8. Apparatus as claimed in claim 1 wherein said switching means comprises solid state electronic circuity.

* * * * *